US010726387B2

(12) United States Patent
Shydo, Jr. et al.

(10) Patent No.: US 10,726,387 B2
(45) Date of Patent: Jul. 28, 2020

(54) AGV TRAFFIC MANAGEMENT SYSTEM

(71) Applicant: Amazon Technologies, Inc., Seattle, WA (US)

(72) Inventors: Robert Michael Shydo, Jr., Pelham, NH (US); Seth Kaufman, Arlington, MA (US); Fahrudin Alagic, Malden, MA (US); Gregory Tierney, Chelmsford, MA (US); Stephen Caldara, Cambridge, MA (US); Jianfeng Pu, Westford, MA (US); Ashish Shah, Lincoln, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/268,445

(22) Filed: Feb. 5, 2019

(65) Prior Publication Data

US 2019/0172005 A1    Jun. 6, 2019

Related U.S. Application Data

(63) Continuation of application No. 15/240,938, filed on Aug. 18, 2016, now Pat. No. 10,255,582.

(51) Int. Cl.
*G06Q 10/08* (2012.01)
*G05D 1/02* (2020.01)
(Continued)

(52) U.S. Cl.
CPC ......... *G06Q 10/087* (2013.01); *G05D 1/0291* (2013.01); *G05D 1/104* (2013.01);
(Continued)

(58) Field of Classification Search
CPC .... G06Q 10/087; G05D 1/0291; G05D 1/104; G05D 1/0297; G05D 2201/0216; G06K 17/0022; G07C 5/008
See application file for complete search history.

(56) References Cited

U.S. PATENT DOCUMENTS 8,280,547 B2    10/2012    D'Andrea et al.
8,412,400 B2     4/2013    D'Andrea et al.
(Continued)

FOREIGN PATENT DOCUMENTS

JP           6373855 U     5/1988
JP        2000285383 A    10/2000
(Continued)

OTHER PUBLICATIONS

U.S. Appl. No. 14/660,247, Entity Monitoring for Kiva Robotic Floors, filed Mar. 17, 2015.
(Continued)

*Primary Examiner* — Michael J Zanelli
(74) *Attorney, Agent, or Firm* — Kilpatrick Townsend & Stockton LLP

(57) ABSTRACT

Techniques for providing a signal processing feature in an inventory management system are described herein. For example, instructions may be received by a computer system of an autonomous vehicle that identify a path to move inventory within a materials handling facility. Further, the computer system of the autonomous vehicle may reduce a current traveling speed of the autonomous vehicle in response to receiving a first signal that is provided by a transmitter coupled with an entity moving within the materials handling facility. The first signal may be span a first distance. In embodiments, the computer system of the autonomous vehicle may stop movement of the autonomous vehicle in response to receiving a second signal provided by the transmitter coupled with the entity. The second signal may span a second distance from the entity that is less than the first distance.

20 Claims, 8 Drawing Sheets

(51) Int. Cl.
*G05D 1/10* (2006.01)
*G06K 17/00* (2006.01)
*G07C 5/00* (2006.01)

(52) U.S. Cl.
CPC ....... *G06K 17/0022* (2013.01); *G05D 1/0297* (2013.01); *G05D 2201/0216* (2013.01); *G07C 5/008* (2013.01)

(56) References Cited

U.S. PATENT DOCUMENTS

| | | |
|---|---|---|
| 8,504,202 B2 | 8/2013 | Ichinose et al. |
| 8,538,692 B2 | 9/2013 | Wurman et al. |
| 8,606,392 B2 | 12/2013 | Wurman et al. |
| 9,070,275 B1 | 6/2015 | Green et al. |
| 9,073,736 B1 | 7/2015 | Hussain et al. |
| 9,087,314 B2 | 7/2015 | Hoffman et al. |
| 9,607,285 B1 | 3/2017 | Wellman |
| 10,081,106 B2 | 9/2018 | Rublee et al. |
| 10,255,582 B2 | 4/2019 | Shydo, Jr. et al. |
| 2005/0077085 A1 | 4/2005 | Zeller et al. |
| 2007/0290040 A1 | 12/2007 | Wurman et al. |
| 2007/0293978 A1 | 12/2007 | Wurman et al. |
| 2008/0051984 A1 | 2/2008 | Wurman et al. |
| 2008/0051985 A1 | 2/2008 | D'Andrea et al. |
| 2008/0309345 A1 | 12/2008 | Zeller et al. |
| 2009/0043462 A1 | 2/2009 | Stratton et al. |
| 2009/0109049 A1 | 4/2009 | Frederick et al. |
| 2009/0256751 A1 | 10/2009 | Zeller et al. |
| 2010/0219835 A1 | 9/2010 | Wentworth |
| 2010/0271009 A1 | 10/2010 | Zeller et al. |
| 2011/0010023 A1 | 1/2011 | Kunzig et al. |
| 2011/0062959 A1 | 3/2011 | Zeller et al. |
| 2011/0093134 A1 | 4/2011 | Emanuel et al. |
| 2012/0143427 A1 | 6/2012 | Hoffman et al. |
| 2012/0239224 A1 | 9/2012 | McCabe et al. |
| 2013/0038320 A1 | 2/2013 | Frederick |
| 2013/0275045 A1 | 10/2013 | Tsujimoto et al. |
| 2013/0302132 A1 | 11/2013 | D'Andrea |
| 2013/0317642 A1 | 11/2013 | Asaria et al. |
| 2014/0100998 A1 | 4/2014 | Mountz et al. |
| 2014/0100999 A1 | 4/2014 | Mountz et al. |
| 2015/0066283 A1 | 3/2015 | Wurman et al. |
| 2015/0353280 A1 | 12/2015 | Brazeau et al. |

FOREIGN PATENT DOCUMENTS

| | | |
|---|---|---|
| JP | 2005242489 A | 9/2005 |
| JP | 2010195530 A | 9/2010 |
| JP | 2015079368 A | 4/2015 |

OTHER PUBLICATIONS

U.S. Appl. No. 14/660,247 , dated Jan. 13, 2016, 25 pages.
U.S. Appl. No. 14/660,247 , "Non-Final Office Action", dated Jul. 29, 2016, 39 pages.
U.S. Appl. No. 14/660,247 , "Notice of Allowance", dated Dec. 2, 2016, 15 pages.
U.S. Appl. No. 15/240,938 , "Notice of Allowance", dated Nov. 28, 2018, 10 pages.
U.S. Appl. No. 15/240,938 , AGV Traffic Management System, filed Aug. 18, 2016.
U.S. Appl. No. 15/450,692 , "Non-Final Office Action", dated Nov. 1, 2018, 15 pages.
U.S. Appl. No. 15/450,692 , Entity Tracking for Kiva Robotic Floors, filed Mar. 6, 2017.
PCT/US2017/047296 , "PCT Search Report", dated Nov. 20, 2017, 12 pages.
PCT/US2017/047296 , "International Preliminary Report on Patentability", dated Feb. 28, 2019, 8 pages.
EP17762261.0 , "Office Action", dated Feb. 24, 2020, 5 pages.
JP2019-507856 , "Office Action", dated Feb. 25, 2020, 12 pages.

AGV TRAFFIC MANAGEMENT SYSTEM

CROSS-REFERENCE TO RELATED APPLICATIONS

This application is a continuation of U.S. patent application Ser. No. 15/240,938, filed Aug. 18, 2016, entitled "AGV Traffic Management System," the entirety of which is incorporated herein by reference.

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, wireless network setup and manpower, can result in lower throughput, unacceptably long response times, an ever-increasing backlog of unfinished tasks, and, in general, poor system performance.

BRIEF DESCRIPTION OF THE DRAWINGS

Various embodiments in accordance with the present disclosure will be described with reference to the drawings, in which.

DETAILED DESCRIPTION

Figure 1:
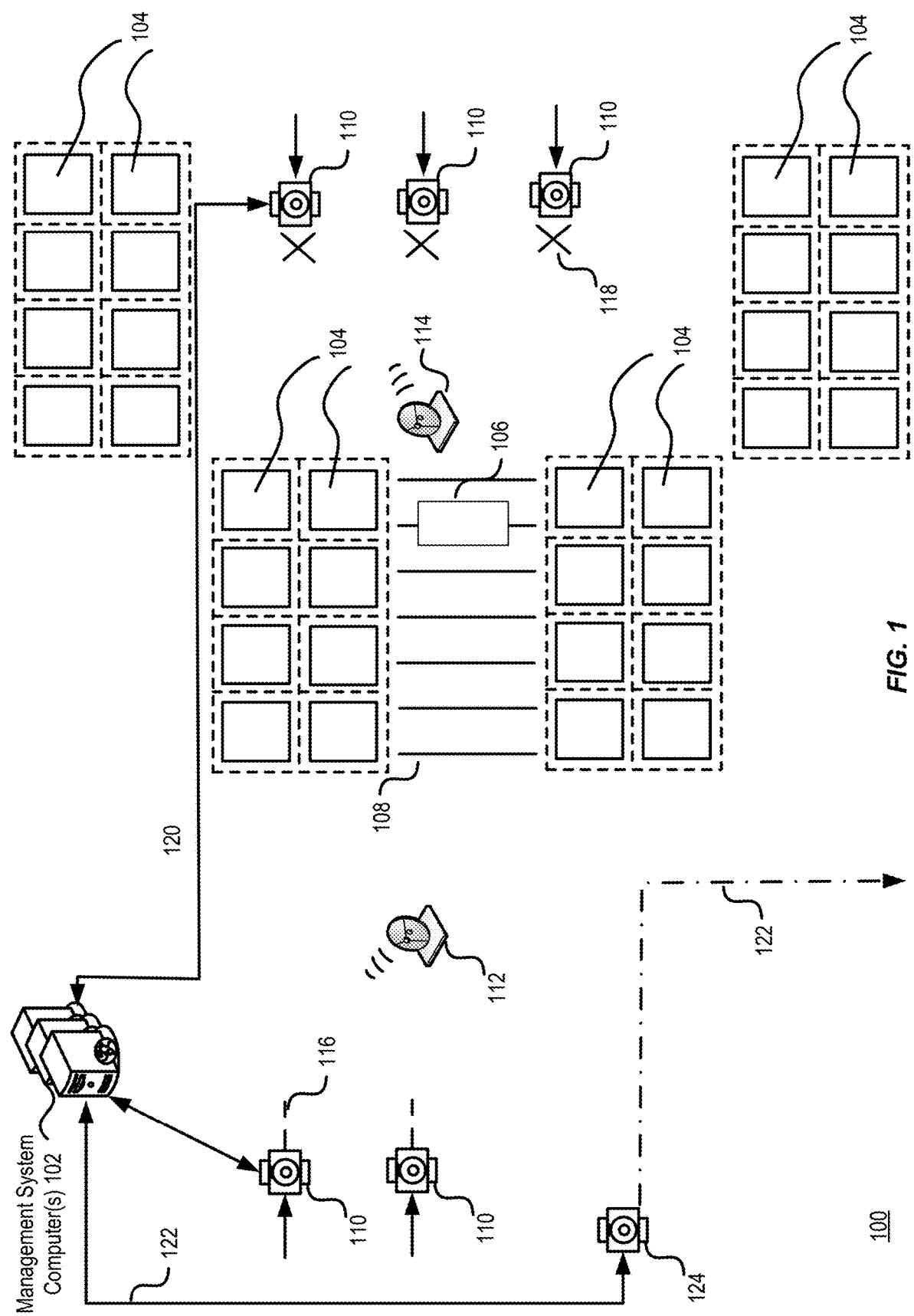
FIG. 1 illustrates an example workflow of a signaling feature in an inventory management system, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory management system having multiple inventory holders and drive units for moving the inventory holders and autonomous guided vehicles for moving inventory and other items in the inventory management system. Specifically, systems and methods are provided for a signal processing module in an inventory management system that, inter alia, manages location information between fixed areas that can serve as cross walks that include components for slowing down and stopping autonomous vehicles and generating instructions to provide to the autonomous vehicles thereby ensuring safe passage to the entity in the inventory management system. In some embodiments, ad-hoc or dynamic areas of the inventory management system may be identified and associated with a cross walk or safe area with corresponding components that will interact with the autonomous vehicles in a surrounding area to reduce their speed or stop their movement. As used herein, an "autonomous vehicle" can include a drive unit (DU), a mobile drive unit, an autonomous guided vehicle (AGV), or other suitable automated or semi-automated vehicle associated with an inventory management system. An inventory management system may include a workspace, a materials handling facility, a warehouse, distribution center, fulfillment center, multiple inventory holders, autonomous vehicles, inventory, areas such as parking lots, non-commercial housing areas, or other unbounded/bounded areas where autonomous vehicles and persons may interact or intersect movement paths, vectors, etc. In embodiments, a workspace may include the components of an inventory management system and represent an inventory management system included an area where autonomous vehicles and various components of the system may interact or intersect movement paths, vectors, etc.

In a non-limiting example, a mobile component (e.g., a facility operator) working in a materials handling facility may desire to enter the materials handling facility to perform maintenance. The materials handling facility may include a plurality of mobile drive units and AGVs for automatically or semi-automatically moving inventory or performing other tasks within the inventory management system according to generated paths. A computer system implementing the signal processing feature may receive an indication from a particular AGV that a receiver of the AGV has received a slow signal from a transmitter associated with a cross walk in the materials handling facility. The indication may identify the location of the particular AGV and that the AGV is reducing its current traveling speed, for example to 0.25 meters/second. Thereafter, the computer system may receive a second indication from the particular AGV that a stop signal from the transmitter associated with the crosswalk has been received by the receiver of the AGV. The AGV may stop moving within the materials handling facility in response to the second signal. The transmitter of the cross walk may provide the slow signal and the stop signal to the particular AGV and other mobile drive units and AGVs within the materials handling facility that travel within a certain distance of the crosswalk when obstacle detection sensors identify the presence of the person within or near the cross walk. Further, the computer system implementing the signal processing feature may generate and provide new paths for mobile drive units and AGVs throughout the materials handling facility to avoid the area that is associated with the cross walk thereby reducing traffic in the area and increasing the efficiency of the materials handling facility by not stopping every active and moving AGV and mobile drive unit in response to the presence of a person or persons in the materials handling facility.

In accordance with at least one embodiment an inventory management system may have multiple access points situated in a materials handling facility or workspace, e.g., warehouse, distribution center, fulfillment center, etc., for communicating with various components of the inventory management system such as autonomous vehicles, entities, communication components of the entities, or transmitters situated throughout the workspace. The materials handling facility or workspace may be comprised of an inside fenced area that includes the multiple inventory holders, inventory, inventory transfer stations, and drive units, and an outside area, (i.e., separate from the inside fenced area and included an unconstrained area) that includes AGVs, industrial equipment and vehicles, and one or more areas designated as fixed safe areas for entities to interact or travel through such as a cross walk. Embodiments described herein can be implemented in either the inside or outside area of a workspace and/or materials handling facility and can utilize either or both of the drive units or AGVs.

In some embodiments, one or more transmitters may be located at certain distances from the identified cross walk areas within the inventory management system that are configured to provide a slow signal (i.e., reducing the current speed of an autonomous vehicle in response to receiving the slow signal) or a stop signal (i.e., stopping movement of the autonomous vehicle in response to receiving the stop signal). In various embodiments, the one or more transmitters may include an ultra-wide band (UWB) radio transmitter that corresponds to a UWB receiver on each autonomous vehicle within the inventory management system. The UWB radio transmitter may be configured to provide a first signal (slow signal) at a first frequency that is different from a second signal (stop signal) that is provided at a second frequency. The UWB radio transmitters may be configured to located at one or more locations with respect to an area identified as a crosswalk to enable a smooth transition from normal movement speed to a reduced speed to a complete stop of an autonomous vehicle that is traveling towards or around the cross walk.

In some embodiments, the one or more transmitters may include a three dimensional (3D) time of flight sensor, a laser curtain or light curtain detection sensor, an optical interrupter sensor, a two dimensional (2D) grey scale imaging and intensity plot detection system, or other suitable object detection technology. Time of flight signal technology can include suitable electronic signal technology that can determine the elapsed time period between transmission of a signal from a source and a return of the signal, or at least a portion thereof, back to the source. Other configurations such as a signal source and signal detector may be utilized to determine time of flight and distance between source/detector or transmitter/receiver. For example, the elapsed time period between the transmission of a signal from a source to detection of the signal, or at least a portion thereof, at a detector or receiver, along with the known speed of the signal (e.g., the speed of light) may be utilized to determine the distance between the source of the signal and the signal detector. In embodiments, the one or more transmitters may communicate with or provide the slow and stop signals to the autonomous vehicles via wireless network technology, Bluetooth, Radio Frequency Identification (RFID), or other suitable communication technology. In some embodiments, the one or more transmitters may be configured to provide the slow and stop signals to autonomous vehicles in response to one or more obstacle detection sensors associated with the cross walk identifying the presence of an entity at or near the cross walk.

In various embodiments, the autonomous vehicles may include one or more auditory or visual components for providing an indication of a current mode (slow mode, stop mode, or normal mode) to entities within the inventory management system. For example, when an autonomous vehicle reduces its speed in response to receiving a slow signal from a transmitter, the autonomous vehicle may provide an auditory signal via associated speakers that identify that it is currently in a slow mode and therefore approaching a cross walk or an entity with appropriate components (described below). To continue the example, an autonomous vehicle may be configured to utilize one or more lights of various colors which can strobe, turn on, or modulate at different frequencies to identify that the autonomous vehicle has stopped moving in response to receiving a stop signal. In embodiments, the autonomous vehicles may be configured to display, via an associated user interface, a representation of its current location and what mode it currently is operating under (slow, stop, or normal). The communication of a mode that the autonomous vehicle is in can be utilized by passing entities to reduce interactions between components of the system and to identify any errors in the components of the autonomous vehicle.

In some embodiments, the autonomous vehicle may provide information that identifies its current location within the inventory management system (i.e., physical location within the workspace/materials handling facility) as well as an identification that a slow or stop signal has been received and processed. The location information for autonomous vehicles that are currently slowing down or stopped in response to receiving signals from transmitters that correspond to a cross walk within the inventory management system may be utilized to generate new paths for other autonomous vehicles of the inventory management system. For example, autonomous vehicles that have a current path that may lead them to an area where one or more autonomous vehicles are currently stopped in response to the presence of an entity may be re-routed to avoid building up traffic or stopping all vehicles within the inventory management system thus increasing efficiency of the system. In embodiments, the historic use or popularity of one or more cross walks within the inventory management system may be utilized to update the previously generated paths for the autonomous vehicles within the inventory management system to bypass or reduce the use of a path that intersects with a highly used cross walk.

In some embodiments, entities that desire to move around or within the inventory management system may be associated with, wear (a piece of clothing or a wearable device), hold (a user device such as a mobile phone or tablet computer), or are coupled with one or more components including a transmission component(s), a receiver component, and a battery component. The components may be associated with a piece of clothing such as a vest or jacket or other housing means which can be worn or held by an entity. In embodiments, the transmission component(s) may be configured to provide the slow and stop signals up to a certain distance around the entity as the entity moves within and around the inventory management system. The slow and stop signals provided by the transmission component(s) to the autonomous vehicles near the entity can be utilized to slow and stop movement of the autonomous vehicles near the entity and thereby enable safe passage of the person throughout the facility. In various embodiments, the receiver component may be configured to receive instructions from a management computer system for error checking and maintenance of the transmission component(s), the receiver component, and the battery component. The battery component may be configured to provide power to the transmission component(s) and the receiver component. The clothing, wearable device, or user device may also be configured to provide an immediate stop function that provides a signal or communication to the management computer system that in turn communicates with all the autonomous vehicles of the inventory management system and causes the vehicles to stop moving.

In some embodiments, one or more areas may be dynamically identified (i.e., in areas other than the fixed area crosswalks) within the inventory management system to associate with a temporary cross walk. For example, an entity walking within the inventory management system may provide an indication to the management computer system that identifies their current location within the facility and the desire to set up a temporary cross walk. Thereafter, the entity may enable a transmitter component(s) and receiver component in their area that serve to provide the slow and stop signals as well as receive information from the management computer system as described above with respect to the fixed cross walk areas. In some embodiments, the user may be able to utilize their clothing, wearable device, user device, associated with the transmission component(s), receiver component, and battery component to set up the temporary cross walk by affixing said components to structures within the inventory management system such as inventory holders, bins, the floor, ceiling, etc. Although embodiments described herein include communication between various components such as a transmitter, receiver, an autonomous vehicle, and one or more computer systems configured to enable the signal processing feature in an inventory management system, a distributed set of logic units can perform the operations described herein. For example, the plurality of autonomous vehicles may be configured to utilize distributed processing for maintaining location information, receiving and processing slow and stop signals, generating new paths, or generating and providing instructions for autonomous vehicles to avoid an area.

The autonomous vehicles may be configured to utilize an imaging device or scanner for reading fiducial markings located throughout the inventory management system to determine the location of the autonomous vehicle which are disclosed in U.S. Patent Publication No. 2012/0143427, published on Jun. 7, 2012, issued as U.S. Pat. No. 9,087,314 on Jun. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS," the entire disclosures of which are herein incorporated by reference. For example, the inventory management system may utilize light emitting elements, such as optical fibers that conduct light from one or more light sources and emit the conducted light at defined physical locations distributed within the inventory management system. The autonomous vehicles may capture an image of one or more of the light emitting elements when moving throughout the inventory management system and the image may be processed to determine the location of the autonomous vehicle within the inventory management system. In an embodiment, a computer system implementing the features described herein may utilize a mapping between captured image to light emitting element placement to determine the location of the autonomous vehicle, entity, or unique light signal(s) detected at various locations may be utilized to determine the location of the autonomous vehicles and/or entities. In embodiments, the inventory management system may utilize barcodes, radio frequency identification (RFID) tags, and any other suitable identifiers that may be scanned or read by the autonomous vehicles to determine the location of the unit within the inventory management system. For example, unique barcodes may be associated with inventory holders distributed in the materials handling facility. As an autonomous vehicle moves throughout the facility an associated scanner may read the barcode and communicate the information contained therein to a computer system that can determine the location of the autonomous vehicle based on the scanned barcode. In accordance with at least one embodiment, one or more fiducial markers may be placed throughout the inventory management system at a distance that an image capture device (such as a camera) can capture an image of the one or more fiducial markers. The fiducial markers may be placed in such a way that a captured image will create a unique combination for each location of an autonomous vehicle or entity within the inventory management system.

FIG. 1 illustrates an example workflow of a signal processing feature in an inventory management system, in accordance with at least one embodiment. A workflow may include a transition, communication between, or process of or by of components, entities, and computer systems within an inventory management system. FIG. 1 illustrates an inventory management system that includes a materials handling facility 100, a management system computer 102, one or more inventory holders 104 (depicted squares included in FIG. 1, such as 104 are inventory holders while the dashed lines surrounding the inventory holders represent inventory holder shelving, framing, or a suitable support structure), and an entity 106 traveling through an area 108 designated as a cross walk within the materials handling facility 100. A cross walk in an inventory management system may include any fixed or dynamic area within a workspace/materials handling facility that has appropriate components (obstacle detection sensors, receivers, transmitters, and power source) for providing safe travel and thoroughfare for entities operating in the inventory management system by providing signals which slow down and/or stop AGVs and DUs that receive said signals at a certain distance from the crosswalk. The inventory management system illustrated in FIG. 1 also includes one or more autonomous vehicles 110, traveling within the materials handling facility according to paths generated by the management system computer 102. As described herein, the cross walk area 108 may be associated or configured to utilize one or more transmitters (112 and 114) to provide a slow signal and a stop signal to the autonomous vehicles 110 approaching the area 108. In embodiments, the transmitters may be placed at various locations around and distances from the area 108. An example transmitter may include a radio transmitter that transmits a signal at a given frequency that is interpreted by an autonomous vehicle as a slow signal or a stop signal when received at the given frequency by a receiver. The location and configuration of the transmitter 112 may be based on the reduced speed of incoming autonomous vehicles 110 such that the entity 106 may travel through the cross walk area 108 safely without having to completely stop the autonomous vehicles 110.

In FIG. 1, the transmitter 112 represents a transmitter that provides a slow signal (or a first signal at a first frequency) that is received by autonomous vehicles 110 (on the left side of FIG. 1). The autonomous vehicles 110 slow down or reduce a current traveling speed 116 (as represented by the dashed line coming from the autonomous vehicle 110) in response to receiving the slow signal from transmitter 112. In embodiments, the transmitter 112 may provide the slow signal to the autonomous vehicle 110 resulting the reduction of speed 116 based on an obstacle detection sensor associated with the transmitter 112 (or as a separate obstacle detection sensor that is not illustrated in FIG. 1). In some embodiments, the transmitter 112 may provide the slow signal to the autonomous vehicle 110 in response to an obstacle detection sensor associated with the cross walk area 108 that identifies the presence of the entity 106 at or near the cross walk area 108. In various embodiments, the transmitters 112 and 114 may continuously provide respective slow and stop signals or, periodically provide such signals in response to the presence of an entity such as via an obstacle detection sensor.

In FIG. 1, the transmitter 114 represents a transmitter that provides a stop signal (or a second signal at a second frequency) that is received by autonomous vehicles 110 (on the right side of FIG. 1). The autonomous vehicles 110 stop moving 118 (as represented by the "X" near autonomous vehicles 110) in response to receiving the stop signal from the transmitter 114. In embodiments, the autonomous vehicles 110 may communicate or provide 120 their respective location within the materials handling facility 100, an indication that the autonomous vehicle has received a slow down or stop signal from transmitters 112 or 114, and an indication of their current mode (slow, stop, or normal movement mode). In embodiments, the management system computer 102 may generate new paths 122 for other autonomous vehicles, such as autonomous vehicle 124, within the materials handling facility that avoid the cross walk area 108 thereby reducing traffic and increasing the efficiency of the materials handling facility by rerouting other autonomous vehicles rather than having a number of autonomous vehicles slow down or stop near the cross walk area 108. In embodiments, autonomous vehicles that have slowed down (autonomous vehicles 110 on the left side of FIG. 1) or stopped (autonomous vehicles 110 on the right side of FIG. 1) may receive instructions to utilize a new path that moves away from the crosswalk area 108. In some embodiments, only autonomous vehicles that have slowed down (110 on the left side of FIG. 1) may receive instructions to utilize a new path that moves away from the crosswalk area 108. In embodiments, each autonomous vehicle 110 may have priority of receiving and interpreting signals from transmitters without further input from outside entities such as management system computer 102. In some embodiments, the management system computer 102 may override the signal priority of the autonomous vehicles 110 to provide further instructions.

In various embodiments, the slowed down or stopped autonomous vehicles 110 may continue to move at a normal traveling speed in the materials handling facility 100 upon the obstacle detection sensor indicating that the entity 106 is no longer in the cross walk area 108. The new path instructions may be provided by the management system computer 102 to the autonomous vehicles 110 via a wireless network. In embodiments, the autonomous vehicle 110 may be configured with one or more receivers that correspond to the transmitters 112 and 114, an associated transmitter component, memory, storage, and a processor for receiving, processing, and generating instructions to slow down, stop, and move the autonomous vehicle 110 within the materials handling facility 100. In some embodiments, the management system computer 102 may provide rerouting instructions (new generated paths) for the autonomous vehicles 110 that are slowed down or stopped based on a distance between the autonomous vehicles 110 and the cross walk area 108 and/or the entity 106 within the materials handling facility. For example, the management system computer 102 may utilize the location information provided by reporting autonomous vehicles 110 and the known location of the cross walk area 108 to identify a distance and compare the distance to one or more maintained thresholds to determine whether to generate and provide new path instructions. The one or more distance thresholds maintained by the management system computer 102 may be based on a plurality of properties such as a number of entities present in the cross walk area 108, the type of autonomous vehicle (drive unit or AGV), the type of materials handling facility 100, or the type of transmitters 112 and 114 utilized in the materials handling facility 100.

Figure 2:
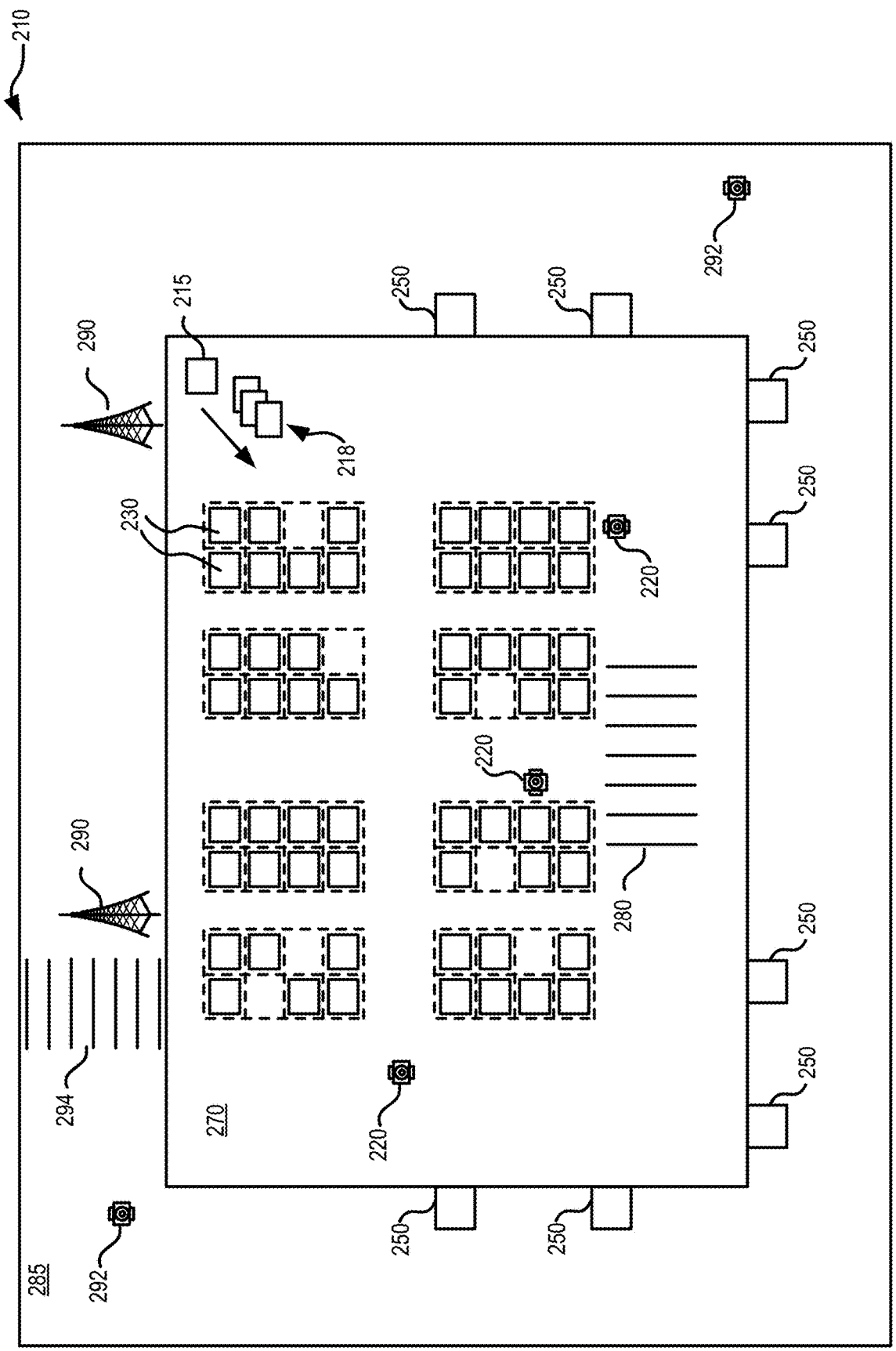
FIG. 2 illustrates example components of a signaling feature in an inventory management system, in accordance with at least one embodiment.

FIG. 2 illustrates components of a signal processing feature in an inventory management system, in accordance with at least one embodiment. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS." Inventory management system 210 includes a management module 215, one or more autonomous vehicles 220, one or more inventory holders 230, one or more inventory stations 250, one or more areas identified as a cross walk 280, an unbounded area 285, and one or more transmitters 290. Autonomous vehicles 220 may transport inventory holders 230 between points within a workspace 270 or unbounded area 285 in response to commands communicated by management module 215. Each inventory holder 230 stores one or more types of inventory items. As a result, inventory management system 210 is capable of moving inventory items between locations within workspace 270 and unbounded area 285 to facilitate the entry, processing, and/or removal of inventory items from the inventory management system 210 and the completion of other tasks involving inventory items.

Management module 215 assigns tasks to appropriate components of inventory management system 210 and coordinates operation of the various components in completing the tasks. These tasks may relate not only to the movement and processing of inventory items, but also to the management and maintenance of the components of inventory management system 210. For example, management module 215 may assign portions of workspace 270 as parking spaces for autonomous vehicles 220, the scheduled recharge or replacement of autonomous vehicle batteries, the storage of empty inventory holders 230, maintenance of location information for the transmitters 290, usage of cross walk areas 280, identity and location of autonomous vehicles 220 that have received and/or are processing slow or stop signals provided by the transmitters 290, or any other operations associated with the functionality supported by inventory management system 210 and its various components. Management module 215 may select components of inventory management system 210 to perform these tasks and communicate appropriate commands and/or data to the selected components to facilitate completion of these operations. Although shown in FIG. 2 as a single, discrete component, management module 215 may represent multiple components and may represent or include portions of autonomous vehicles 220 or other elements of inventory management system 210. As a result, any or all of the interactions between a particular autonomous vehicle 220 and management module 215 that are described herein may, in particular embodiments, represent peer-to-peer communication between that autonomous vehicle 220 and one or more other autonomous vehicles 220. The contents and operation of an example embodiment of management module 215 which implements the signal processing feature in an inventory management system are discussed further below with respect to FIG. 3.

Autonomous vehicles 220 move inventory holders 230 between locations within workspace 270 and unbounded area 285. Autonomous vehicles 220 may represent any devices or components appropriate for use in inventory management system 210 based on the characteristics and configuration of inventory holders 230 and/or other elements of inventory management system 210. In a particular embodiment of inventory management system 210, autonomous vehicles 220 represent independent, self-powered devices configured to freely move about workspace 270 and unbounded area 285. In alternative embodiments, autonomous vehicles 220 represent elements of a tracked inventory management system configured to move inventory holder 230 along tracks, rails, cables, crane system, or other guidance or support elements traversing workspace 270. In such an embodiment, autonomous vehicles 220 may receive power and/or support through a connection to the guidance elements, such as a powered rail. Additionally, in particular embodiments of inventory management system 210 autonomous vehicles 220 may be configured to utilize alternative conveyance equipment to move within workspace 270 and/or between separate portions of workspace 270 and unbounded area 285.

Additionally, autonomous vehicles 220 may be capable of communicating with management module 215 to receive information identifying selected inventory holders 230, transmit the locations of autonomous vehicles 220, or exchange any other suitable information to be used by management module 215 or autonomous vehicles 220 during operation. Autonomous vehicles 220 may communicate with management module 215 wirelessly, using access points (not pictured) located within or about the workspace 270 and unbounded area 285 of the inventory management system 210, and/or in any other appropriate manner. As one example, particular embodiments of autonomous vehicles 220 may communicate with management module 215 and/or with one another using 802.11, Bluetooth, or Infrared Data Association (IrDA) standards, or any other appropriate wireless communication protocol via the access points. As another example, in a tracked inventory management system 210, tracks or other guidance elements upon which autonomous vehicles 220 move may be wired to facilitate communication between autonomous vehicles 220 and other components of inventory management system 210. Furthermore, as noted above, management module 215 may include components of individual autonomous vehicles 220. Thus, for the purposes of this description, communication between management module 215 and a particular autonomous vehicle 220 may represent communication between components of a particular autonomous vehicle 220 and an access point transmitting information to the management module 215. In general, autonomous vehicles 220 may be powered, propelled, and controlled in any manner appropriate based on the configuration and characteristics of inventory management system 210.

Inventory holders 230 store inventory items. In a particular embodiment, inventory holders 230 include multiple storage bins with each storage bin capable of holding one or more types of inventory items. Inventory holders 230 are capable of being carried, rolled, and/or otherwise moved by autonomous vehicles 220. In particular embodiments, inventory holder 230 may provide additional propulsion to supplement that provided by autonomous vehicle 220 when moving inventory holder 230.

Additionally, each inventory holder 230 may include a plurality of faces, and each bin may be accessible through one or more faces of the inventory holder 230. For example, in a particular embodiment, inventory holder 230 includes four faces. In such an embodiment, bins located at a corner of two faces may be accessible through either of those two faces, while each of the other bins is accessible through an opening in one of the four faces. Autonomous vehicles 220 may be configured to rotate inventory holder 230 at appropriate times to present a particular face and the bins associated with that face to an operator or other components of inventory management system 210.

Inventory items represent any objects suitable for storage, retrieval, and/or processing in an automated inventory management system 210. For the purposes of this description, "inventory items" may represent any one or more objects of a particular type that are stored in inventory management system 210. Thus, a particular inventory holder 230 is currently "storing" a particular inventory item if the inventory holder 230 currently holds one or more units of that type. As one example, inventory management system 210 may represent a mail order warehouse facility, and inventory items may represent merchandise stored in the warehouse facility. During operation, autonomous vehicles 220 may retrieve inventory holders 230 containing one or more inventory items requested in an order to be packed for delivery to a customer or inventory holders 230 carrying pallets containing aggregated collections of inventory items for shipment. Moreover, in particular embodiments of inventory management system 210, boxes containing completed orders may themselves represent inventory items.

In particular embodiments, inventory management system 210 may also include one or more inventory stations 250. Inventory stations 250 represent locations designated for the completion of particular tasks involving inventory items. Such tasks may include the removal of inventory items from inventory holders 230, the introduction of inventory items into inventory holders 230, the counting of inventory items in inventory holders 230, the decomposition of inventory items (e.g., from pallet- or case-sized groups to individual inventory items), the consolidation of inventory items between inventory holders 230, and/or the processing or handling of inventory items in any other suitable manner. In particular embodiments, inventory stations 250 may just represent the physical locations where a particular task involving inventory items can be completed within workspace 270 or unbounded area 285. In alternative embodiments, inventory stations 250 may represent both the physical location and also any appropriate equipment for processing or handling inventory items, such as scanners for monitoring the flow of inventory items in and out of inventory management system 210, communication interfaces for communicating with management module 215, and/or any other suitable components. Inventory stations 250 may be controlled, entirely or in part, by entity operators or may be fully automated. Moreover, the entity or automated operators of inventory stations 250 may be capable of performing certain tasks to inventory items, such as packing, counting, or transferring inventory items, as part of the operation of inventory management system 210.

Workspace 270 and unbounded area 285 represents an area associated with inventory management system 210 in which autonomous vehicles 220 can move and/or inventory holders 230 can be stored. For example, workspace 270 and unbounded area 285 may represent all or part of the floor of a mail-order warehouse in which inventory management system 210 operates. Although FIG. 2 shows, for the purposes of illustration, an embodiment of inventory management system 210 in which workspace 270 includes a fixed, predetermined, and finite physical space, particular embodiments of inventory management system 210 may include autonomous vehicles 220 and inventory holders 230 that are configured to operate within a workspace 270 that is of variable dimensions and/or an arbitrary geometry such as unbounded area 285. While FIG. 2 illustrates a particular embodiment of inventory management system 210 in which workspace 270 is entirely enclosed in a building, alternative embodiments may utilize workspaces 270 in which some or all of the workspace 270 is located outdoors, within a vehicle (such as a cargo ship), or otherwise unconstrained by any fixed structure or associated with an unbounded area 285.

In operation, management module 215 selects appropriate components to complete particular tasks and transmits task assignments 218 to the selected components to trigger completion of the relevant tasks. Each task assignment 218 defines one or more tasks to be completed by a particular component. These tasks may relate to the retrieval, storage, replenishment, and counting of inventory items and/or the management of autonomous vehicles 220, inventory holders 230, inventory stations 250, and other components of inventory management system 210. Depending on the component and the task to be completed, a particular task assignment 218 may identify locations, components, and/or actions associated with the corresponding task and/or any other appropriate information to be used by the relevant component in completing the assigned task.

In particular embodiments, management module 215 generates task assignments 218 based, in part, on inventory requests that management module 215 receives from other components of inventory management system 210 and/or from external components in communication with management module 215. These inventory requests identify particular operations to be completed involving inventory items stored or to be stored within inventory management system 210 and may represent communication of any suitable form. For example, in particular embodiments, an inventory request may represent a shipping order specifying particular inventory items that have been purchased by a customer and that are to be retrieved from inventory management system 210 for shipment to the customer. Management module 215 may also generate task assignments 218 independently of such inventory requests, as part of the overall management and maintenance of inventory management system 210. For example, management module 215 may generate task assignments 218 in response to the occurrence of a particular event (e.g., in response to an autonomous vehicle 220 requesting a space to park), according to a predetermined schedule (e.g., as part of a daily start-up routine), or at any appropriate time based on the configuration and characteristics of inventory management system 210. After generating one or more task assignments 218, management module 215 transmits the generated task assignments 218 to appropriate components for completion of the corresponding task. The relevant components then execute their assigned tasks.

With respect to autonomous vehicles 220 specifically, management module 215 may, in particular embodiments, communicate task assignments 218 to selected autonomous vehicles 220 that identify one or more destinations for the selected autonomous vehicles 220. Management module 215 may select an autonomous vehicle 220 to assign the relevant task based on the location or state of the selected autonomous vehicle 220 (slowed, stopped, normal movement, parked, etc.), an indication that the selected autonomous vehicle 220 has completed a previously-assigned task, a predetermined schedule, and/or any other suitable consideration. These destinations may be associated with an inventory request the management module 215 is executing or a management objective the management module 215 is attempting to fulfill. For example, the task assignment may define the location of an inventory holder 230 to be retrieved, an inventory station 250 to be visited, a storage location where the autonomous vehicle 220 should park until receiving another task, or a location associated with any other task appropriate based on the configuration, characteristics, and/or state of inventory management system 210, as a whole, or individual components of inventory management system 210. For example, in particular embodiments, such decisions may be based on the popularity of particular inventory items, the staffing of a particular inventory station 250, the tasks currently assigned to a particular autonomous vehicle 220, and/or any other appropriate considerations.

While the appropriate components of inventory management system 210 complete assigned tasks, management module 215 may interact with the relevant components to ensure the efficient use of space, equipment, manpower, and other resources available to inventory management system 210. As one specific example of such interaction, management module 215 is responsible, in particular embodiments, for planning the paths autonomous vehicles 220 take when moving within workspace 270 and unbounded area 285 and for allocating use of a particular portion of workspace 270 and unbounded area 285 to a particular autonomous vehicle 220 for purposes of completing an assigned task. In such embodiments, autonomous vehicles 220 may, in response to being assigned a task, request a path to a particular destination associated with the task. Moreover, while the description below focuses on one or more embodiments in which autonomous vehicles 220 requests paths from management module 215, autonomous vehicles 220 may, in alternative embodiments, generate its own paths. FIG. 2 also depicts one or more autonomous vehicles 292 interacting and moving within unbounded area 285 of the inventory management system. The autonomous vehicles 292 may also receive signals provided by transmitters 290, slow down or stop in response to receiving said signals, and communicate with management module 215 to provide information and/or receiver further instructions. In embodiments, autonomous vehicles 292 may slow down and/or stop when approaching crosswalk 294 to reduce interactions between entities traveling within the unbounded area 285. In some embodiments, the cross walk 280 may represent a temporary and dynamically generated area for workspace 270 and cross walk 294 may represent a fixed or static area within unbounded area 285.

Components of inventory management system 210 may provide information to management module 215 regarding their current state, other components of inventory management system 210 with which they are interacting, and/or other conditions relevant to the operation of inventory management system 210. This may allow management module 215 to utilize feedback from the relevant components to update algorithm parameters, adjust policies, or otherwise modify its decision-making to respond to changes in operating conditions or the occurrence of particular events. For example, transmitters 290 or receivers and transmitter components associated with an autonomous vehicle may provide reception of a particular signal and location information associated with the access points to the management module 215 for use in embodiments described herein.

In addition, while management module 215 may be configured to manage various aspects of the operation of the components of inventory management system 210, in particular embodiments, the components themselves may also be responsible for decision-making relating to certain aspects of their operation, thereby reducing the processing load on management module 215.

As used herein, the phrase "access points" includes devices that act as transmitters and receivers of local area wireless network signals (e.g., "Wi-Fi", Long Term Evolution (LTE), Bluetooth, WirelessHD and WiGig, and Z-Wave). Location information may include the ID of the autonomous vehicle 220, X, Y and Z coordinates of the autonomous vehicle in an inventory management system 210, a timestamp from when the autonomous vehicle that sent the information to the computer system, roam time between access points (the time period for the mobile drive unit to successfully switch from one access point to another within the inventory management system), received signal strength indicators, timeouts that occur when at least one autonomous vehicle switches from one access point to another, beacons from the access points, and/or bitrates. As used herein, the phrase "autonomous vehicle" may include a unit that is capable of moving within the inventory management system workspace and may include any appropriate components for propelling itself and navigating to a particular destination within the inventory management system workspace. The autonomous vehicle may also be capable of gathering and sending information about the inventory management system's network connectivity. A mobile drive unit/AGV/drive unit may be a type of autonomous vehicle, in particular, an autonomous ground vehicle. As used herein, the phrase "timestamp" may include information about the time and/or date when information was received by or transmitted from the autonomous vehicle. As used herein, the phrases "beacon" or "beacon information" may include information indicating the frequency with which an access point announces its presence to surrounding autonomous vehicles.

Figure 3:
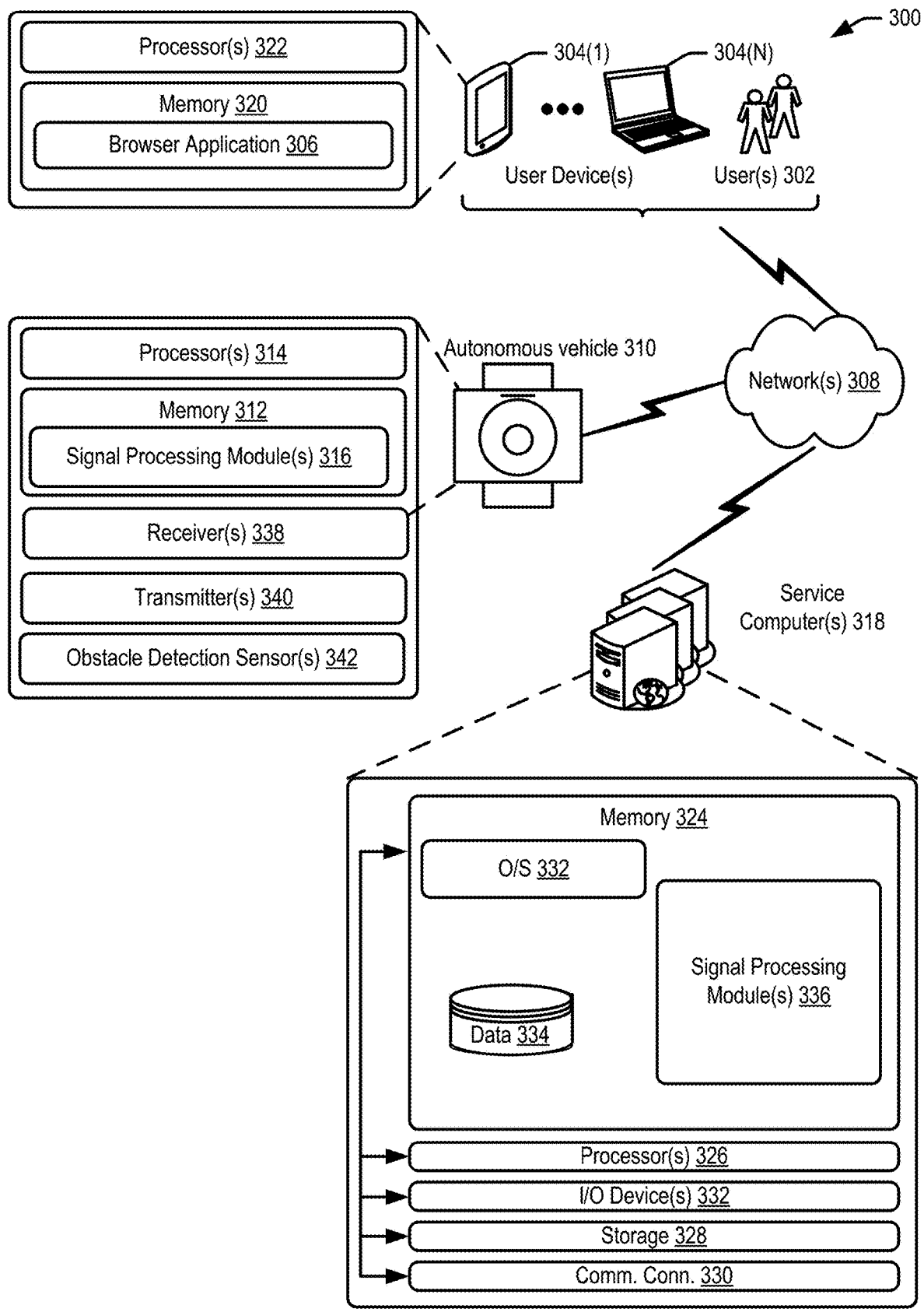
FIG. 3 illustrates an example architecture for a signaling feature in an inventory management system that includes one or more service computers, an autonomous vehicle, and a user device connected via one or more networks, in accordance with at least one embodiment.

FIG. 3 illustrates an example architecture for a signal processing feature in an inventory management system as described herein that includes one or more service computers, an autonomous vehicle, and a user device connected via one or more networks, in accordance with at least one embodiment. In architecture 300, one or more users 302 (e.g., inventory management system administrators or working entities associated with the inventory management system) may utilize user computing devices 304(1)-(N) (collectively, user devices 304) to access a browser application 306 or a user interface (UI) accessible through the browser application 306, via one or more networks 308 to request access to the inventory management system and/or materials handling facility, and provide input regarding generated paths for reducing interactions between components of the system or for providing an indication for an immediate stop for autonomous vehicles within the inventory management system as described herein. The "browser application" 306 can be any browser control or native application that can access and display a network page or other information. A native application may include an application or program that has been developed for use on a particular platform (such as an operating system) or a particular device (such as a particular type of mobile device).

In accordance with at least one embodiment, the user devices 304 may be configured with the signal transmitter and/or receiver, as described herein, for communicating with autonomous vehicles, such as autonomous vehicle 310. In embodiments, the signal transmitter and/or receiver may be included in a standalone, dedicated device, a wearable device (such as a lanyard, necklace, bracelet, ring, etc.), or an article of clothing (such as a hat, glove, vest, etc.). The dedicated, wearable, or article of clothing devices may include memory and processors similar to the memory 320 and processors 322 of the user devices 304 for implementing aspects of the signal processing feature in the inventory management system. Each type of device (dedicated, wearable, or article of clothing) may utilize any signal provider and/or detection configuration or any receiver or transmitter configuration described herein as appropriate given the nature of the device to communicate with the autonomous vehicle 310. For example, wearable device embodiments may utilize a UWB receiver/transmitter configuration while an article of clothing may utilize a camera image capture/transmitter configuration to communicate with the autonomous vehicle 310.

The architecture 300 may also include an autonomous vehicle 310 that may be configured to move within the inventory management system slow down or stop in response to signals provided by a transmitter, and transfer inventory or other items within the inventory transfer station, as described herein. In embodiments, the autonomous vehicle 310 may be an example of an autonomous vehicle as described herein. The autonomous vehicle 310 may include at least one memory 312 and one or more processing units or processor(s) 314. The memory 312 may store program instructions that are loadable and executable on the processor(s) 314, as well as data generated during the execution of these programs. Depending on the configuration and type of autonomous vehicle 310, the memory 312 may be volatile (such as random access memory (RAM)) and/or non-volatile (such as read-only memory (ROM), flash memory, etc.). The autonomous vehicle 310 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the autonomous vehicle 310. In some implementations, the memory 312 may include multiple different types of memory, such as static random access memory (SRAM), dynamic random access memory (DRAM), or ROM. In embodiments, the autonomous vehicle may have a receiver and a transmitter(s) (not pictured) for communicating with one or more transmitters in the inventory management system, the user device 304, and/or the service computers 318. In embodiments, the autonomous vehicle 310 may also include receiver(s) 338 for receiving signals from transmitters or transmitter components associated with cross walk areas, vests or other wearable devices associated with the user 302, or the service computers 318. The autonomous vehicle 310 may also include transmitter(s) 340 for providing information to obstacle detection sensors in the inventory management system or providing information, such as location information for the autonomous vehicle 310, to the service computers 318. In embodiments, the autonomous vehicle 310 may include obstacle detection sensor(s) 342 that utilizes suitable obstacle detection technology (i.e., three dimensional (3D) time of flight sensors, a laser curtain or light curtain detection sensor, an optical interrupter sensor, a two dimensional (2D) grey scale imaging and intensity plot detection system) to detect the presence of an entity or other object within the inventory management system.

Turning to the contents of the memory 312 in more detail, the memory 312 may include an operating system and one or more application programs or services for implementing the features disclosed herein. Additionally, the memory 312 may include one or more modules 316 for implementing the features described herein. For example, the modules 316 may be configured to receive and process a slow signal to reduce the current traveling speed of the autonomous vehicle 310, receive and process a stop signal to stop movement of the autonomous vehicle 310, and/or communicate the location and reception of a slow/stop signal to the service computers 318. In embodiments, the signal processing module 316 may be configured to communicate with one or more other autonomous vehicles within the inventory management system to generate new paths for the other autonomous vehicles within the inventory transfer station. The autonomous vehicle 310 may also include geo-location devices (e.g., a global positioning system (GPS) device or the like) for providing and/or recording geographic location information associated with the autonomous vehicle 310. In embodiments, the autonomous vehicle 310 may also utilize other sensor technologies for determining location information such as imaging devices, scanners, radio frequency identification (RFID) readers that are configured to read fiducial markings, barcodes, RFID tags, or other identifiers from the surrounding environment (such as markings or identifiers located on inventory holders 230 within the inventory management system 270 of FIG. 2) to determine their own location.

The architecture 300 may also include one or more service provider computers 318 that may, in some examples, provide computing resources such as, but not limited to, client entities, low latency data storage, durable data storage, data access, management, virtualization, hosted computing environment or "cloud-based" solutions, electronic content performance management, etc. The one or more service provider computers 318 may implement or be an example of the management system computer(s) 102 or the management module 215 of FIGS. 1 and 2. The one or more service provider computers 318 may also be operable to provide site hosting, computer application development, and/or implementation platforms, combinations of the foregoing, or the like to the one or more users 302.

In some examples, the networks 308 may include any one or a combination of many different types of networks, such as cable networks, the Internet, wireless networks, cellular networks and other private and/or public networks. While the illustrated example represents the users 302 and autonomous vehicle 310 communicating with the service provider computers 318 over the networks 308, the described techniques may equally apply in instances where the users 302 interact with the one or more service provider computers 318 via the one or more user devices 304 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 318 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 318 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 318 may be in communication with the user device 304 via the networks 308, or via other network connections. The one or more service provider computers 318 may include one or more servers, perhaps arranged in a cluster or as individual servers not associated with one another.

In one illustrative configuration, the one or more service provider computers 318 may include at least one memory 324 and one or more processing units or processors(s) 326. The processor(s) 326 may be implemented as appropriate in hardware, computer-executable instructions, firmware, or combinations thereof. Computer-executable instruction or firmware implementations of the processor(s) 326 may include computer-executable or machine-executable instructions written in any suitable programming language to perform the various functions described when executed by a hardware computing device, such as a processor. The memory 324 may store program instructions that are loadable and executable on the processor(s) 326, as well as data generated during the execution of these programs. Depending on the configuration and type of the one or more service provider computers 318, the memory 324 may be volatile (such as RAM) and/or non-volatile (such as ROM, flash memory, etc.). The one or more service provider computers 318 or servers may also include additional storage 328, which may include removable storage and/or non-removable storage. The additional storage 328 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 324 may include multiple different types of memory, such as SRAM, DRAM, or ROM.

The memory 324, the additional storage 328, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 324 and the additional storage 328 are all examples of non-transitory computer storage media. Additional types of non-transitory computer storage media that may be present in the one or more service provider computers 318 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more service provider computers 318. Combinations of any of the above should also be included within the scope of non-transitory computer-readable media.

The one or more service provider computers 318 may also contain communication connection interface(s) 330 that allow the one or more service provider computers 318 to communicate with a data store, another computing device or server, user terminals and/or other devices on the networks 308. The one or more service provider computers 318 may also include I/O device(s) 332, such as a keyboard, a mouse, a pen, a voice input device, a touch input device, a display, speakers, a printer, etc.

Turning to the contents of the memory 324 in more detail, the memory 324 may include an operating system 332, one or more data stores 334, and/or one or more application programs or services for implementing the features disclosed herein including the signal processing module(s) 336. In accordance with at least one embodiment, the signal processing module(s) 336 may be configured to at least maintain the location of ad-hoc or dynamically generated cross walks within the inventory management system, the historical usage of the dynamically generated cross walks or fixed cross walks within the inventory management system, generate new paths for autonomous vehicles that override or alter previously generated paths based on information obtained from entities and autonomous vehicles within the inventory management system, receive and process a slow signal to reduce the current traveling speed of an autonomous vehicle 310, receive and process a stop signal to stop movement of the autonomous vehicle 310, and/or reception of an origination location of a slow or stop signal within the inventory management system.

Figure 4:
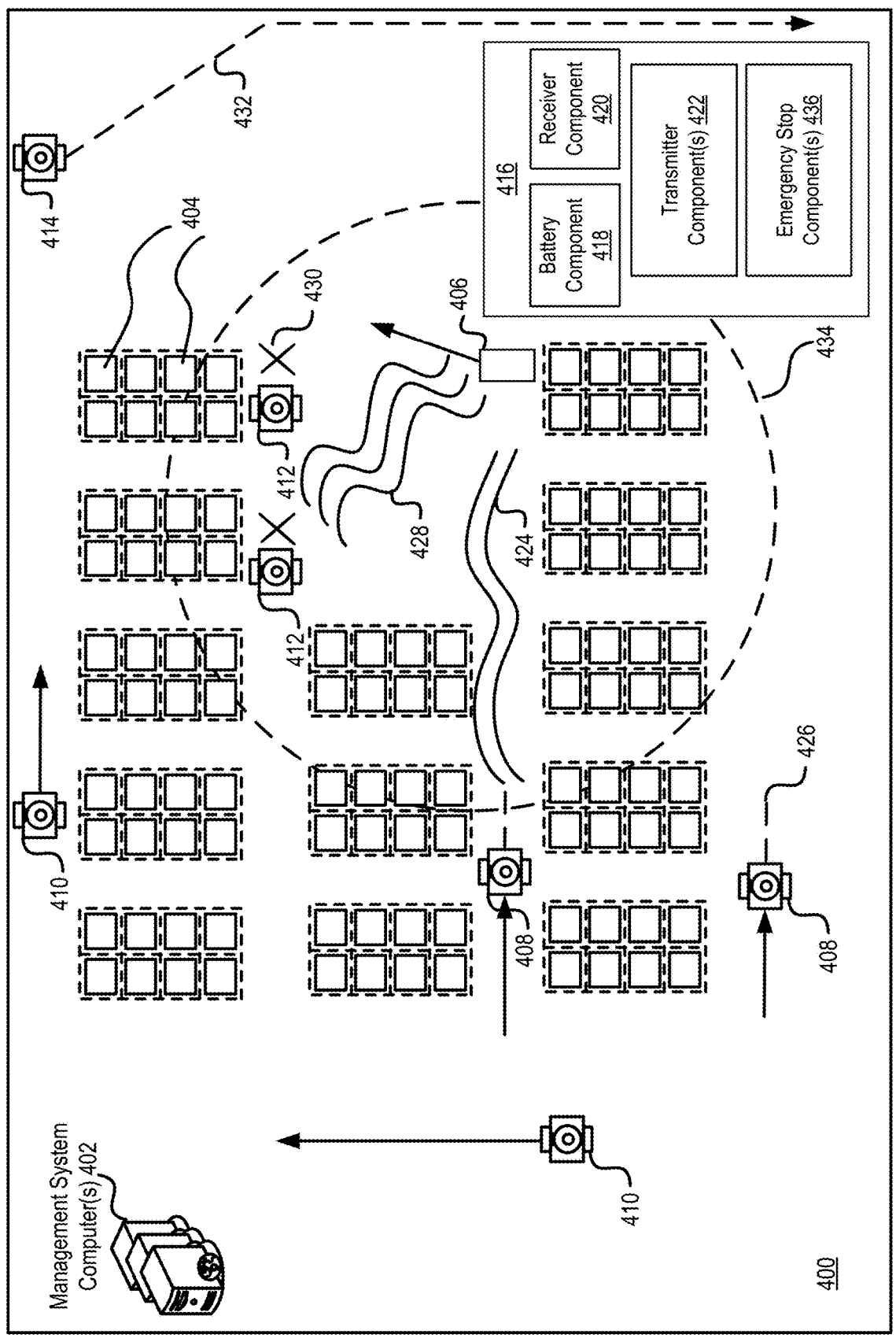
FIG. 4 illustrates an example workflow of signaling feature in an inventory management system, in accordance with at least one embodiment.

FIG. 4 illustrates an example workflow of a signal processing feature in an inventory management system, in accordance with at least one embodiment. FIG. 4 illustrates a workspace 400 that includes a management system computer 402, one or more inventory holders 404, an entity 406 (such as an associate or person desiring access to the workspace 400), and a plurality of autonomous vehicles 408, 410, 412, and 414. As described herein, an entity 406 may be associated with or wear an article of clothing (such as vest 416) that includes a battery component 418, a receiver component 420, a transmitter component 422, and an immediate stop component 436. As described herein, the immediate stop component 436 may be interacted with or by entity 406 to provide an indication or information to the management system computer 402 that further instructs the autonomous vehicles within the workspace 400 to stop moving. In embodiments, the transmitter component 422 may be configured to transmit or provide a first signal (slow signal) 424 that identifies a slowdown instruction or causes the autonomous vehicle 408 to reduce a current traveling speed 426 (represented by the dashed line coming from autonomous vehicles 408). As illustrated in FIG. 4, the autonomous vehicles 408 slowdown 426 or reduce their current traveling speed in response to receiving the first signal 424 from the transmitter component 422.

In FIG. 4, autonomous vehicles 410 continue on their own paths (as indicated by the associated arrows which may represent velocity vectors within the workspace 400) as they are not in range to receive the first signal 424 or the second signal 428 that indicate a slow down or stop of the autonomous vehicles 410. For example, the first signal 424 and second signal 428 may be of a certain frequency, power range, etc., that they only are provided up to 40 feet from the vest 416. As described herein, the transmitter component 422 may be configured to provide or transmit a second signal 428 that identifies a stop instruction or causes the autonomous vehicles 412 to stop moving 430 (as represented by the "X"). In embodiments, the second signal 428 may be provided at a certain frequency such that it travels for a distance less than the frequency and corresponding distance of the first signal 424 thereby affecting a transition from normal speed to a reduced speed to a complete stop of autonomous vehicles. In embodiments, the receiver component 420 may be configured to receive instructions from the management system computers 402 that can be utilized to error check and identify deficiencies in the equipment or components 418-422 of the vest 416 associated with the entity 406. In some embodiments, the battery component 418 may be configured to provide power to the receiver component 420 and transmitter component(s) 422 and modulate the power provided to the transmitter component(s) 422 to control the distance of the signals 424 and 428 provided. FIG. 4 also includes a bounded area (represented by the dashed line circle 434) that represents the range or zone that the signals 424 and 428 are provided within to reduce interactions of the entity 406 with other components within the workspace 400. In various embodiments, the autonomous vehicles 408 and 412 may provide an indication that a slow signal 424 or stop signal 428 has been received and their current location within the workspace 400. The indication of receiving signals 424 or 428 and the location information may be utilized by the management system computers 402 to generate new paths 432 for autonomous vehicle 414 thereby avoiding the entity 406 within the workspace 400.

Figure 5:
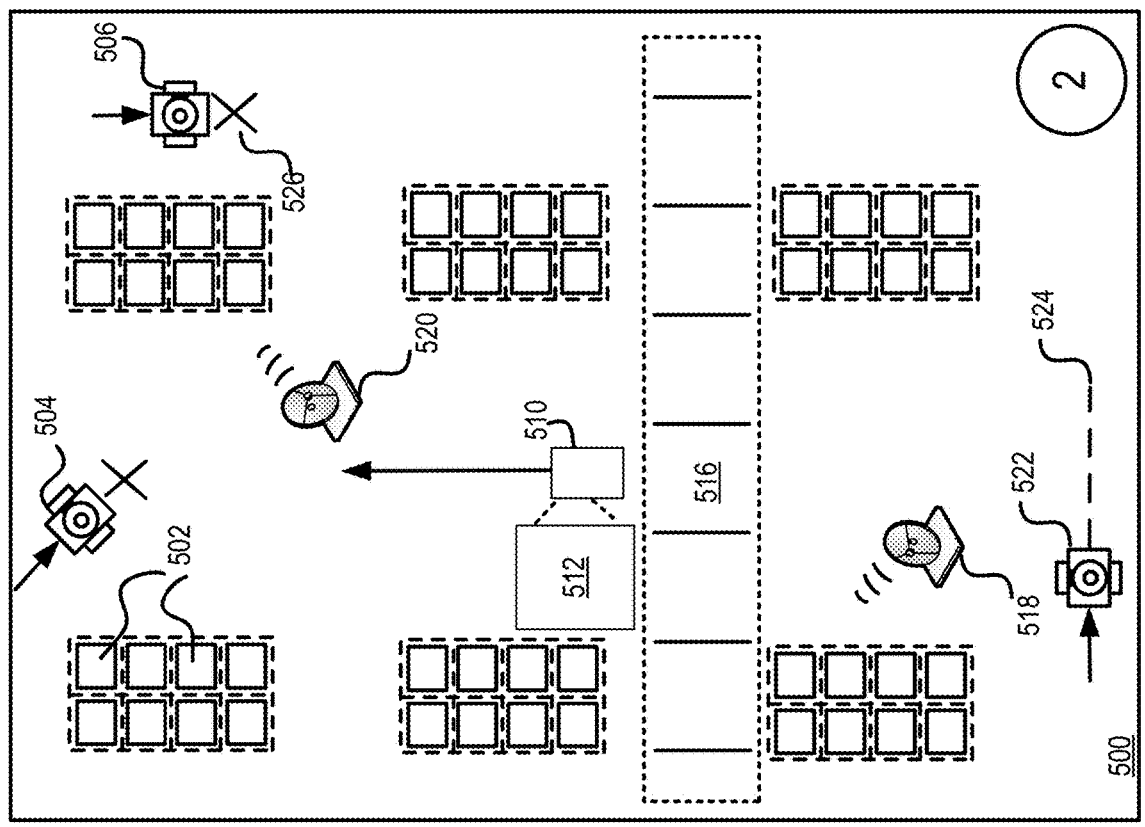
FIG. 5 illustrates an example workflow of signaling feature in an inventory management system, in accordance with at least one embodiment.
Figure 5:
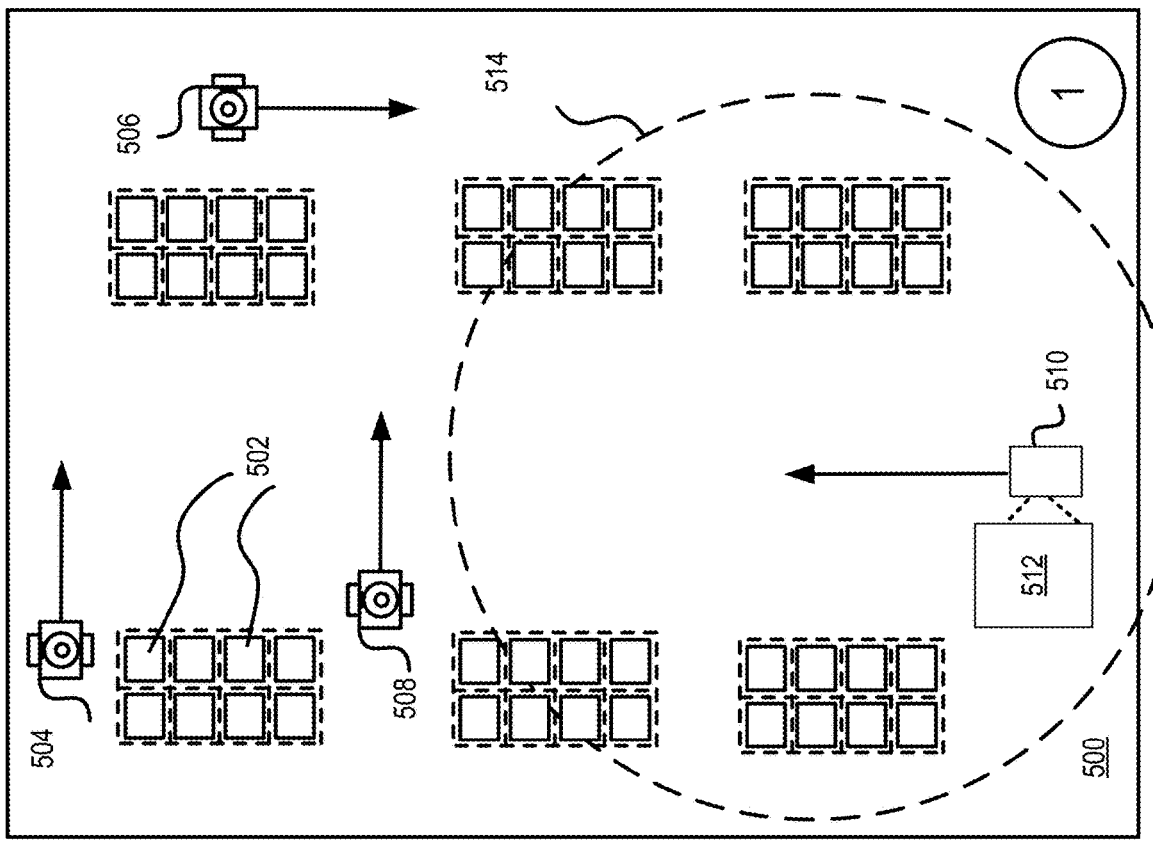

FIG. 5 illustrates an example workflow of a signal processing feature in an inventory management system, in accordance with at least one embodiment. FIG. 5 depicts a workspace 500 that includes one or more inventory holders 502, a plurality of autonomous vehicles 504, 506, and 508, an entity 510 with a vest 512 (that can be an example of the vest 416 with components 418-422 from FIG. 4) moving within workspace 500 at Step 1. As described herein, the entity 510 may move through the workspace 500 and be associated with a zone 514 that represents the area in which autonomous vehicles 504, 506, and 508 may slow down or stop based on signals provided by the vest 512 upon entering the zone 514. As depicted in FIG. 5, the autonomous vehicles 405, 506, and 508 continue on their normal generated paths at a normal speed as they have not entered the zone 514.

At Step 2 of FIG. 5, the entity 510 has communicated, via the vest 512, to the management computer system (not pictured) that a dynamic or ad-hoc cross walk 516 is generated within the workspace 500. For example, the entity 510 may remove transmitter components from the vest 512 to identify boundaries for the dynamic cross walk 516 within the workspace 500. In some embodiments, the entity 510 may utilize transmitters 518 and 520 to create the dynamic cross walk 516. As described herein, one transmitter (518) may be configured to provide a slow signal that, when received by autonomous vehicle 522, causes the autonomous vehicle 522 to reduce its current traveling speed 524 (represented by the dashed line coming from autonomous vehicle 522). The transmitter 520 may be configured to provide a stop signal that, when received by autonomous vehicles 504 and 506, causes the autonomous vehicles 504 and 506 to stop moving 526. In some embodiments, the location and boundaries of the dynamic cross walk 516 are provided to the management computer system that can utilize the information to generate new path instructions for other autonomous vehicles within the workspace 500. When the entity 510 desires to remove or de-allocate the area 516 as a dynamic cross walk, the entity 510 can remove power to or pick up transmitter components 518 and 520 to cease transmission of the slow and stop signals. In embodiments, the management computer system may utilize the location and use of dynamic cross walks within a particular area of the workspace 500 to generate new paths or update previously generated paths to avoid the area and reduce traffic. In some embodiments, inert and/or immobile structures, such as a pole or stand, may be located throughout the workspace 500 that may indicate locations for forming a dynamic crosswalk 516. Each structure may be associated with one or more transmitters (such as transmitters 518 and 520) for providing slow and stop signals within an area to generate the dynamic cross walk 516 and enable safe interaction between the entity 510 and autonomous vehicles 504, 506, and 522. In various embodiments, the inert and/or immobile structures may comprise or be associated with a user interface for defining the boundaries of the dynamic cross walk area 516 and activate/deactivate appropriate transmitters placed throughout the workspace 500 to transmit the slow and stop signals.

Figure 6:
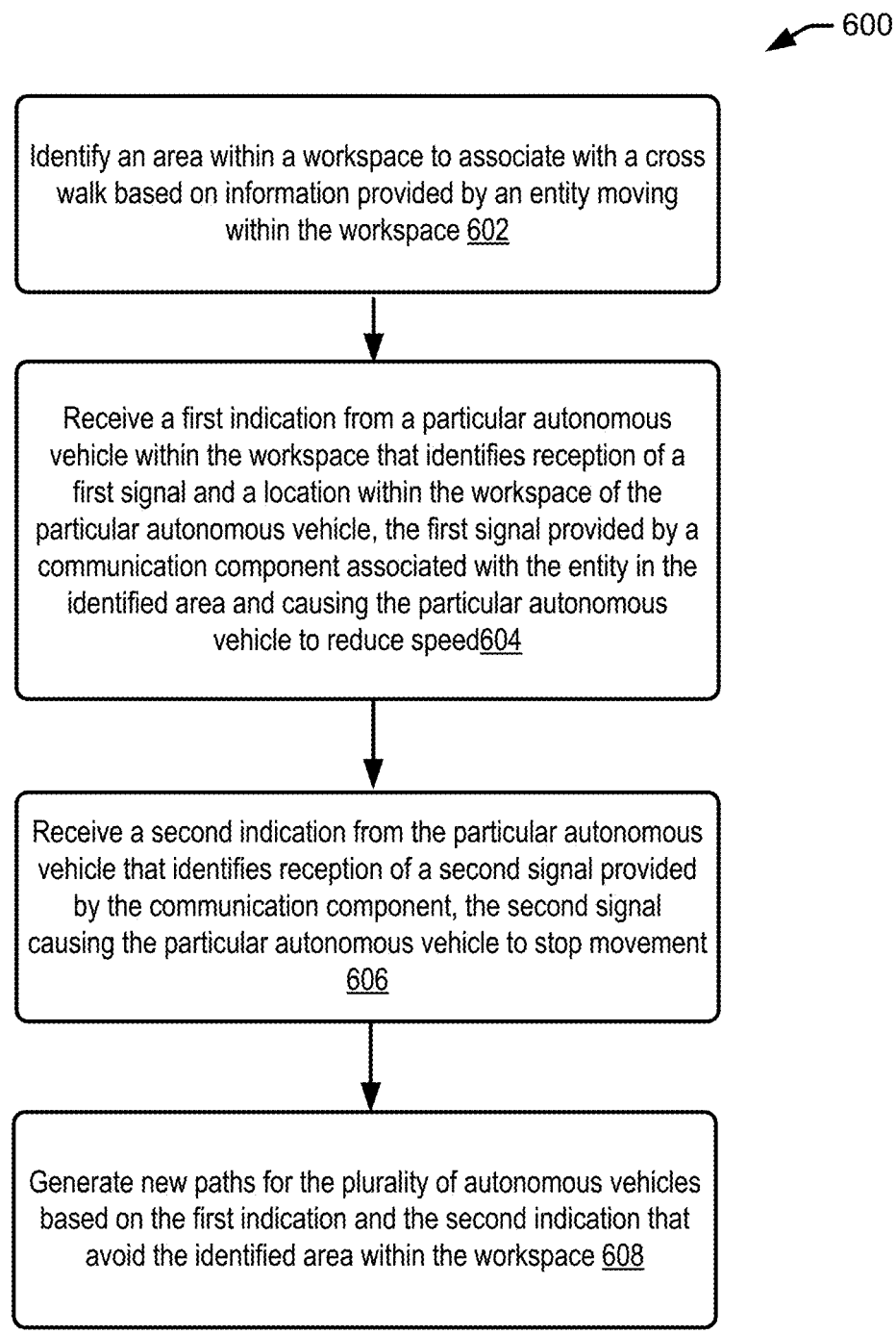
FIG. 6 illustrates a flow diagram of an example process for a signaling feature in an inventory management system, in accordance with at least one embodiment.
Figure 7:
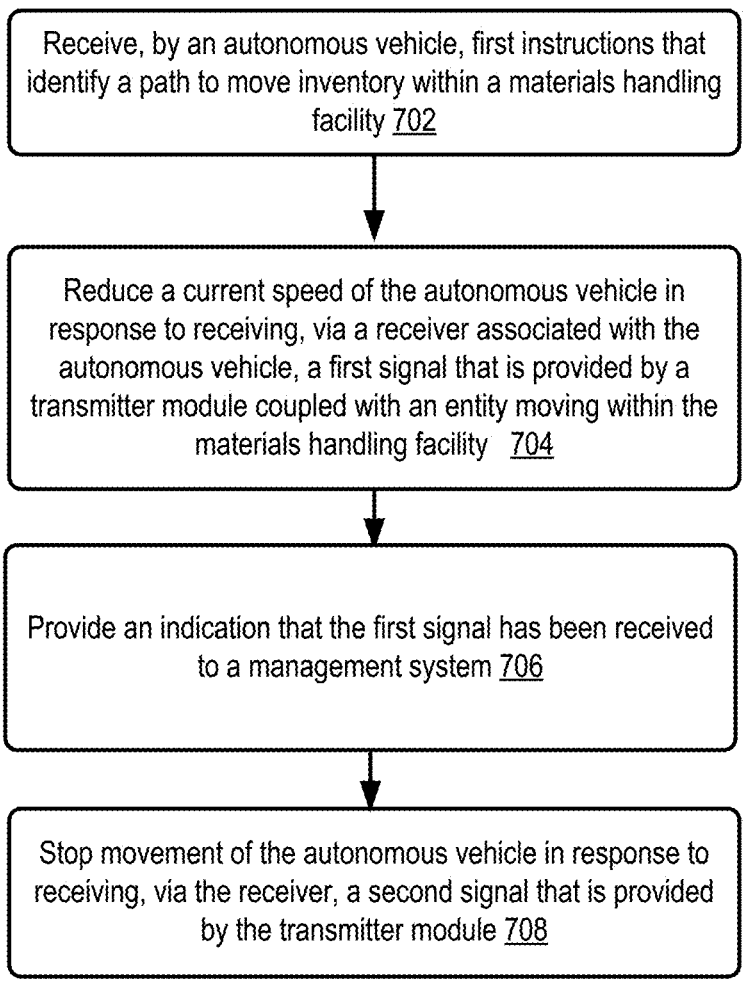
FIG. 7 illustrates a flow diagram of an example process for a signaling feature in an inventory management system, in accordance with at least one embodiment.

FIGS. 6 and 7 illustrate example flows for a signal processing feature in an inventory management system, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the process (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

In some examples, the one or more service computers 318 and or the autonomous vehicle 310 (e.g., utilizing at least one of the signal processing module 316 or 336) shown in FIG. 3, may perform the processes 600 and 700 of FIGS. 6 and 7. In FIG. 6 the process 600 may include identifying an area within a workspace to associate with a cross walk based on information provided by an entity moving within the workspace at 602. In an embodiment, the area identified within the workspace may represent a dynamic cross walk that serves to allow associates and other entities to safely travel within the workspace while slowing down and stopping autonomous vehicles that travel near the dynamically placed crosswalk. The process 600 may include receiving a first indication from a particular autonomous vehicle within the workspace that identifies receiving a first signal and a location within the workspace of the vehicle at 604. In some embodiments, the first signal may be provided by a communication component associated with the entity in the identified area and may cause the particular autonomous vehicle to reduce speed. For example, an associate wearing a vest or other piece of clothing that contains a communication component, such as a radio transmitter, may provide the first signal at a first frequency that is identified by a receiver associated with the particular autonomous vehicle and processed by an associated computer system that causes the vehicle to reduce its current traveling speed.

The process 600 may include receiving a second indication from the particular autonomous vehicle that identifies receiving a second signal provided by the communication component at 606. As described above, the second signal may be provided at a second frequency that is different from the first frequency and cause the particular autonomous vehicle to stop movement all together. Further, in some embodiments, the second signal may be provided up to or within a distance that is less than the distance that the first signal is provided up to so that a transition from normal speed, to a reduced speed, to a complete stop occurs as an autonomous vehicle approaches the dynamic cross walk (identified area) or an entity associated with the features described herein. The process 600 may conclude at 608 by generating new paths for the plurality of autonomous vehicles based on the first indication and the second indication. The newly generated paths may avoid the identified area within the workspace thereby increasing the efficiency of the workspace as autonomous vehicles can avoid the identified area to still complete an inventory transfer without having to reduce speed or come to a complete stop.

In FIG. 7, the process 700 may include receiving, by an autonomous vehicle, first instructions that identify a path to move inventory within a materials handling facility at 702. In an embodiment, the first instructions include instructions for navigating the materials handling facility by the autonomous vehicle absent moving inventory. The process 700 may include reducing a current speed of the autonomous vehicle in response to receiving, via an associated receiver, a first signal that is provided by a transmitter module coupled with an entity moving within the materials handling facility at 704. In an embodiment, the entity may be wearing or associated with a vest or other wearable device and/or user device that have one or more components including a transmitter module, a receiver module, and a battery module. In embodiments, the receiver module may be configured to receive error checking instructions from a management computer system for identifying problems or defects with the components associated with the entity. Should the error checking instructions identify an error or defect in the associated components, the management computer system may provide immediate stop instructions to the plurality of autonomous vehicles within the materials handling facility.

The process 700 may include providing an indication that the first signal has been received to a management system at 706. As described above, the management system may utilize the location of the reporting autonomous vehicle to generate new paths and instructions for other autonomous vehicles within the materials handling facility to avoid the location of the reporting autonomous vehicle thereby reducing traffic in the area and improving the overall efficiency of the materials handling facility. The process 700 may conclude at 708 by stopping movement of the autonomous vehicle in response to receiving, via the associated receiver, a second signal that is provided by the transmitter module associated with the entity. In some embodiments, the first signal may be provided first or at a distance that is greater than the second signal so that a transition from reduced speed to stopping can occur before the autonomous vehicle gets within a certain distance of the entity.

Figure 8:
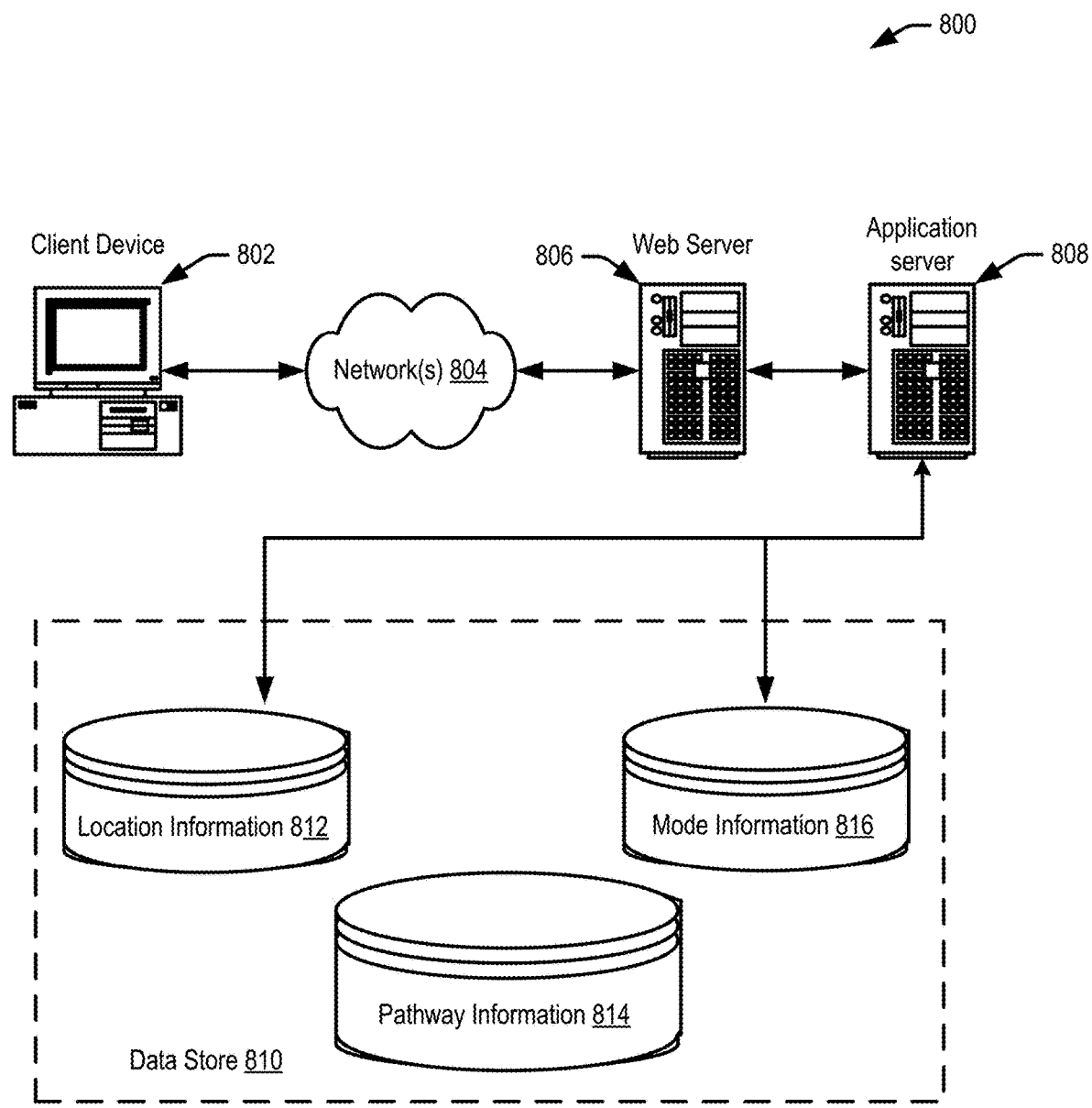
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing location information 812 for the autonomous vehicles, and mode information 816 that identifies a mode of each autonomous vehicle within a workspace such as slow mode, stop mode, or normal mode, which can be used to serve content for the system administrators, associates, or other entities monitoring or interacting within the inventory management system. The data store also is shown to include a mechanism for storing pathway information 814, which can be used for reporting, analysis, or other such purposes such as generating new paths or updating paths in accordance with trends identified by analyzing historical data of locations of dynamic crosswalks or fixed crosswalks within the inventory management system. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory management system, comprising:
a transmitter device configured to transmit a first signal at a first frequency and a second signal at a second frequency; and
an autonomous guided vehicle (AGV) configured to move within a workspace, the AGV comprising one or more processors configured to:
receive the first signal at the first frequency from the transmitter device;
execute a first operation at the AGV to reduce a speed of the AGV based at least in part on receiving the first signal at the first frequency;
receive the second signal at the second frequency from the transmitter device; and
execute a second operation at the AGV to halt motion of the AGV based at least in part on receiving the second signal at the second frequency.

2. The inventory management system of claim 1, wherein the inventory management system further comprises a management system computer configured to manage a plurality of AGVs within the inventory management system, and wherein the one or more processors of the AGV are further configured to:
transmit, to the management system computer, an indication that the first signal was received or a second indication that the second signal was received, wherein the management system generates a new path for at least one AGV within the inventory management system based at least in part on receiving the first indication or the second indication.

3. The inventory management system of claim 2, wherein the transmitter device is a wearable device.

4. The inventory management system of claim 2, wherein the first signal is associated with a first signal range, wherein the second signal is associated with a second signal range, and wherein the first signal range is greater than the second signal range.

5. A computer-implemented method performed by a computing system of an autonomous vehicle operating within a workspace, comprising:
receiving first instructions identifying a path to move within the workspace;
during execution of the first instructions, receiving a first signal from a transmitter device of the workspace, the first signal having a first transmission range of a first distance from the transmitter device;
executing a first operation at the autonomous vehicle to reduce a speed of the autonomous vehicle based at least in part on receiving the first signal;
while operating at a reduced speed, receiving a second signal from the transmitter device of the workspace, the second signal having a second transmission range of a second distance from the transmitter device, the first distance being greater than the second distance; and
executing a second operation at the autonomous vehicle to halt motion based at least in part on receiving the second signal.

6. The computer-implemented method of claim 5, wherein the first signal corresponds to a first frequency and the second signal corresponds to a second frequency that differs from the first frequency.

7. The computer-implemented method of claim 5, wherein the transmitter device is affixed to a wearable article of clothing.

8. The computer-implemented method of claim 5, further comprising:
altering a path of execution associated with the autonomous vehicle based at least in part on receiving the first signal or the second signal.

9. The computer-implemented method of claim 5, further comprising:
causing another path of execution associated with another autonomous vehicle within the workspace to be altered based at least in part on receiving the first signal or the second signal.

10. The computer-implemented method of claim 9, further comprising:
identifying a zone of the workspace based at least in part on receiving the first signal or the second signal; and
transmitting data to a management system that causes the management system to generate paths for other autonomous vehicles within the workspace based at least in part on avoiding the zone.

11. The computer-implemented method of claim 5, wherein the transmitter device is portable.

12. The computer-implemented method of claim 5, further comprising:
presenting an audible notification that the autonomous vehicle is operating in a slow mode based at least in part on receiving the first signal.

13. The computer-implemented method of claim 5, further comprising:
presenting a visual indication that the autonomous vehicle is operating in a slow mode based at least in part on receiving the first signal.

14. An inventory management system, comprising:
a plurality of autonomous vehicles configured to move within a workspace according to generated paths, an autonomous vehicle of the plurality of autonomous vehicles comprising:

a receiver configured to receive a first signal of a first frequency and a second signal of a second frequency; and a transmitter configured to communicate with a management computer system, the management computer system configured to:

receive a first indication from a particular autonomous vehicle of the plurality of autonomous vehicles, the first indication indicating reception of the first signal by the receiver;

based at least in part on receiving the first indication, instruct the particular autonomous vehicle to reduce a travelling speed;

receive a second indication from the particular autonomous vehicle, the second indication indicating reception of the second signal by the receiver; and based at least in part on receiving the second indication, instruct the particular autonomous vehicle to stop moving within the workspace.

15. The inventory management system of claim 14, wherein the management computer system is further configured to:

generate location information defining an area of the workspace associated with the first signal; and modify a path of at least one autonomous vehicle of the inventory management system based at least in part on the location information.

16. The inventory management system of claim 15, further comprising:

generating new paths for the plurality of autonomous vehicles based in part on receiving the first indication or the second indication.

17. The inventory management system of claim 15, wherein the signals received by the receiver include wireless network signals.

18. The inventory management system of claim 14, further comprising:

a wearable device comprising a first transmitter configured to generate the first signal;

a second transmitter configured to generate the second signal; and a communications transmitter configured to communicate with the management computer system, wherein the management computer system is further configured to:

receive, from the communications transmitter, an immediate stop indication, wherein receiving the immediate stop indication causes the management computer system to halt all autonomous vehicles within the workspace.

19. The inventory management system of claim 18, wherein the first transmitter transmits the first signal at the first frequency having a first range of a first distance, and wherein the second transmitter transmits the second signal at the second frequency having a second range of a second distance.

20. The inventory management system of claim 19, wherein the first distance is greater than the second distance.

* * * * *